No. 787,210.

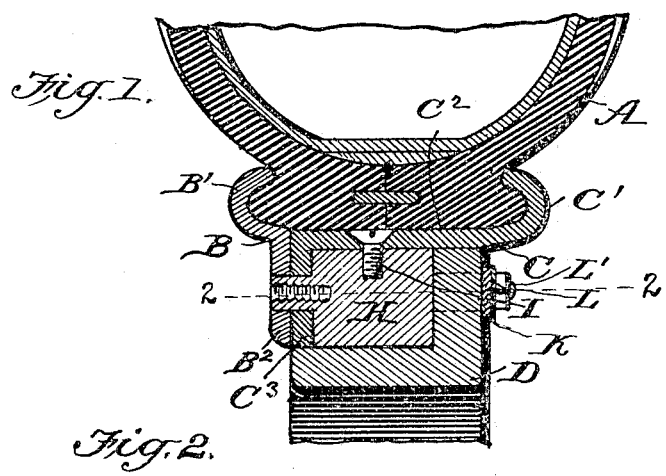
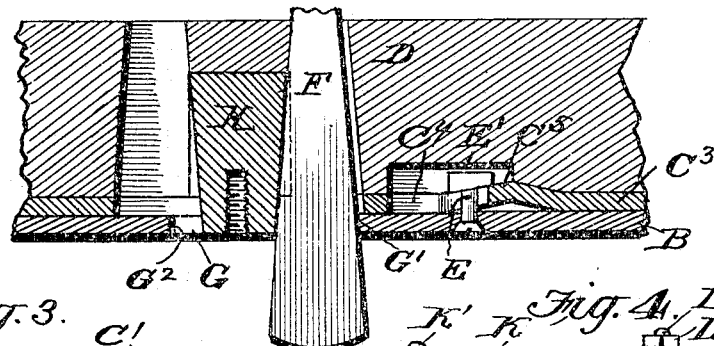
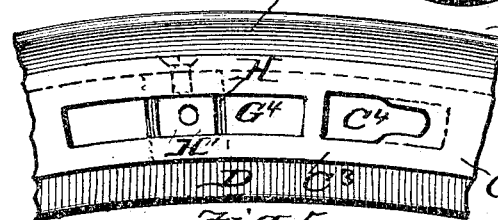
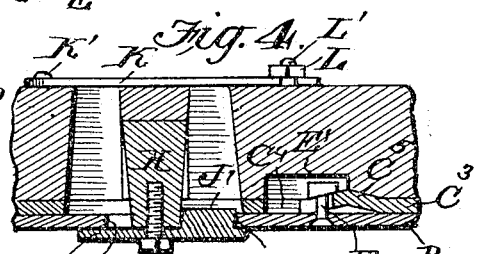
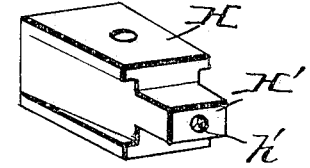

Patented April 11, 1905.

UNITED STATES PATENT OFFICE.

JOSEPH B. McMULLEN, OF HOWARD COUNTY, MARYLAND.

WHEEL.

SPECIFICATION forming part of Letters Patent No. 787,210, dated April 11, 1905.

Application filed February 16, 1904. Renewed November 1, 1904. Serial No. 230,980.

*To all whom it may concern:*

Be it known that I, JOSEPH B. McMULLEN, a citizen of the United States, and a resident of Howard county, in the State of Maryland, have made certain new and useful Improvements in Wheels, of which the following is a specification.

My invention is an improvement in wheels, and is designed particularly for use on automobiles or other vehicles of that general character; and the invention has for an object, among others, to provide a novel construction whereby the tire may be conveniently applied and removed from the wheel by means of a removable side plate; and the invention consists in certain novel constructions and combinations of parts, as will be hereinafter described and claimed.

In the drawings, Figure 1 is a cross-sectional view of the rim of a wheel provided with my improvement. Fig. 2 is a partial longitudinal section on about line 2 2 of Fig. 1. Fig. 3 is a side view of a portion of the rim of a wheel with the detachable side plate removed. Fig. 4 is a sectional view somewhat similar to Fig. 2, but with the operating-wedge removed and the cover and locking-plates adjusted to cover the openings in which said wedge operates. Fig. 5 is a side view of a portion of the rim of a wheel with the parts as shown in Fig. 4, and Fig. 6 is a detail perspective view of the abutment or block.

The tire A is fitted to the rim of the wheel and may be applied and removed through the aid of the removable side plate B. This side plate B is provided with a tire flange or extension B', and the other plate, C, is provided with a tire flange or extension C', which grips the opposite side of the tire from the flange B', such flanges coöperating in securing the tire when adjusted and secured in the position shown in Fig. 1. The plate B has the flange B' and the wing B², lapped alongside the rim D of the wheel, as shown in Fig. 1. The plate C has the flange C', the wing C², extending along the outer circumference of the rim D, and also is provided with the face-wing C³, which is fitted in a rabbet in the side of the rim D and is lapped on its outer face by the wing B² of the plate B. Means are provided for removably securing the detachable plate B, preferably by the interlocking devices arranged to secure the detachable plate, the latter being movable in a circular direction into and out of engagement with the interlocking devices. To this end I provide the face-wing C³ of the plate C with a keyhole-slot C⁴ and at the inner side of the contracted portion of said slot with an inclined face C⁵, preferably formed, as shown in Fig. 2, by bending the middle of the wing C³ and forming an inclined surface, upon which rides the head E' of the stud E, which latter is secured to the detachable side plate B, as will be understood from Figs. 2 and 4 of the drawings.

In Fig. 2 the detachable side plate B is shown interlocked by its headed stud E with the face-wing C³ of the opposite side plate C. If now the plate B be moved from the position shown in Fig. 2 to the left until the head E' of the stud E comes opposite the larger portion of the slot C⁴, the plate B can be removed from the wheel, and said plate can be applied to the wheel by an operation the reverse of that just described. For operating the side plate B, I prefer to employ a wedge F, arranged to operate between an abutment in the rim of the wheel and the edges G' or G² of a slot G, cut in the removable plate B. This abutment in connection with the rim of the wheel is preferably a separate block H, which may be seated within the rim of the wheel, as shown in Figs. 1, 2, and 4, and may be secured in any suitable manner in position. As shown, the abutment-block H is secured by a screw I to the rim-wing C² of the plate C, as best shown in Fig. 1 of the drawings. In the construction shown the block H is provided at its outer end with a tongue H', which projects through a slot in the wing C³ and into the slot G in the plate B, so an abutting surface is provided directly opposite the walls G' and G² of the slot G. In operation the key when driven in, as shown in Fig. 2, forces the plate B to locked position. If now the wedge be driven on the opposite side of the abutment and between the same and the wall G² of the slot G, the plate B will be adjusted to a position in which it will be released from the plate C and can be removed as desired. If it is desired to lock the plate B in the position shown in Figs. 2 and 4, in which it is interlocked with the plate C, a block J' may be arranged between the abutment and the wall G' of the slot G in order to prevent any retrograde movement of the plate B when the wheel is in use. The abutment-block H is socketed at $h'$ to receive the screw $H^2$, which may be tightened up against the plate B in order to lock the said plate when adjusted to the position shown in Figs. 3 and 4; but I prefer for such purpose to employ the locking-plate J, (shown in Fig. 4,) having an opening through which the screw $H^2$ may be passed in order to secure the said plate in the position shown in Fig. 4, said plate also having the block J' fitting in the space between the abutment H and the plate B to prevent any retrograde movement of the said plate when the latter is adjusted to the position shown in Fig. 4, as well as to exclude dust and the like from the openings in which the key F operates in moving said plate B from one position to the other. To prevent the ingress of dirt at the opposite ends of the key-openings, I provide a swinging cover-plate K, pivoted at one end K' on one side of the slot G and arranged to be swung from the position indicated in dotted lines, Fig. 5, to that shown in full lines in same figure, in which it will cover the slot G and prevent ingress of dirt, snow, and the like. At its swinging end the cover-plate K is hooked or otherwise adapted to engage with the bolt L and be secured by the nut L', as will be understood from Figs. 1 and 5 of the drawings.

Having thus described my invention, what I claim as new, and desire to secure by Letters Patent, is—

1. The improvement in wheels herein described, comprising in combination the rim, the plate, having a rim-wing fitting against the outer periphery of the rim, a tire-flange projecting from said wing at one edge of the rim, an inwardly-projecting face-wing lapping against the opposite side of the rim and provided with a keyhole-slot and with an inclined surface adjacent the smaller portion of said slot, the abutment-block fitting within the rim and secured to said plate, the detachable side plate having a tire-securing flange opposite that of the first plate, and provided with a face-wing lapping against the outer side of the face-wing on the said first plate and provided with a slot extending on opposite sides of the abutment-block, and arranged at its end walls for engagement by an operating wedge or key, the headed stud on such face-plate, and the cover-plate arranged to cover the slot in said face-plate, substantially as set forth.

2. The combination of the rim, the plate secured to the rim, the detachable plate having a slot for the introduction of an operating-wedge, an abutment in the rim for engagement by said wedge, and interlocking devices between the detachable plate and the plate secured to the rim, the detachable plate being movable in a circular direction into and out of locked position.

3. The combination of the rim, the plate secured to the rim, the detachable plate having a slot for the introduction of an operating-wedge, an abutment in the rim for engagement by said wedge and interlocking devices between the detachable plate and the plate secured to the rim, the detachable plate being movable in a circular direction into and out of locked position, and a cover for the slot in the detachable plate substantially as set forth.

4. The combination of the rim, the plate secured thereto, and having a wing lapping against the outer periphery of the rim and provided at one edge of the rim with an outwardly-projecting tire-securing flange and at the other edge of the rim with an inwardly-projecting face-wing, the abutment-block in the rim and secured to the peripheral wing of the said plate, the detachable side plate having a slot for the introduction of an operating-wedge, and interlocking devices between the detachable plate and the plate secured to the rim, substantially as set forth.

5. The combination in a wheel, of the rim, a plate secured to the rim, a detachable plate having a slot for the introduction of an operating-wedge, an abutment in the rim for engagement by said wedge, interlocking devices between the detachable plate and the plate secured to the rim, and the locking-plate having a stop-block for preventing retrograde movement of the detachable rim, and means for securing said locking-plate.

6. The combination of the rim, a tire-securing flange or plate at one side thereof, a detachable plate or flange at the other side of the rim and having a slot for the passage of an operating key or wedge, an abutment in the rim opposite the edge wall of the slot in the detachable plate, and interlocking devices for securing the detachable plate, the latter being movable in a circular direction into and out of engagement with the interlocking devices.

7. A wheel having the detachable flange-plate which is movable in a circular direction into and out of interlocking engagement with the rim of the wheel, and has provision for the introduction of a key by which to forcibly move the flange-plate in a circular direction.

JOSEPH B. McMULLEN.

Witnesses:
J. SHORB NEALE,
DYSART McMULLEN.